United States Patent
Cambus-Brunet et al.

(10) Patent No.: US 7,530,408 B2
(45) Date of Patent: May 12, 2009

(54) METHOD OF CONSOLIDATING AN UNDERGROUND FORMATION

(75) Inventors: Chrystel Cambus-Brunet, Richebourg (FR); Véronique Barlet-Gouedard, Chatenay Malabry (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/597,049

(22) PCT Filed: Jan. 4, 2005

(86) PCT No.: PCT/EP2005/000054

§ 371 (c)(1), (2), (4) Date: Jul. 10, 2006

(87) PCT Pub. No.: WO2005/068778

PCT Pub. Date: Jul. 28, 2005

(65) Prior Publication Data

US 2007/0167331 A1     Jul. 19, 2007

(30) Foreign Application Priority Data

Jan. 16, 2004    (EP) ................................. 04290127

(51) Int. Cl.
     *E21B 7/00*      (2006.01)
     *E21B 33/13*      (2006.01)
     *C09K 8/02*      (2006.01)

(52) U.S. Cl. ........................... 175/72; 175/64; 175/65; 166/292; 166/300; 166/400

(58) Field of Classification Search ................... None
See application file for complete search history.

(56) References Cited

U.S. PATENT DOCUMENTS

| 4,606,407 A | 8/1986 | Shu |
| 4,670,165 A | 6/1987 | Black et al. |
| 4,799,548 A * | 1/1989 | Mumallah et al. ........... 166/288 |
| 5,086,089 A | 2/1992 | Shu |

(Continued)

FOREIGN PATENT DOCUMENTS

| EP | 0601988 | 9/1999 |
| WO | 0149971 A1 | 7/2001 |

OTHER PUBLICATIONS

"Lactic Acid." retrieved from http://en.wikipedia.org/wiki/Lactic_acid on Jun. 21, 2007.*

(Continued)

*Primary Examiner*—Zakiya W Bates
*Assistant Examiner*—Angela M DiTrani
(74) *Attorney, Agent, or Firm*—David Cate; Robin Nava; Dale Gaudier

(57) ABSTRACT

A method of stabilizing an underground formation surrounding a borehole comprising placing a treatment fluid in the formation, the treatment fluid comprising cross-linkable polymer and a cross-linking agent, and allowing the treatment fluid to gel in-situ, characterized in that after placement of the treatment fluid in the formation, an activator fluid is pumped into the well to bring about cross linking of the polymer to form the gel.

17 Claims, 4 Drawing Sheets

U.S. PATENT DOCUMENTS

| | | | |
|---|---|---|---|
| 5,642,783 A | | 7/1997 | Moradi-Araghi et al. |
| 5,789,350 A | * | 8/1998 | Moradi-Araghi et al. .... 507/203 |
| 5,789,351 A | | 8/1998 | Ahmed et al. |
| 5,849,674 A | * | 12/1998 | Fox et al. .................... 507/140 |
| 6,011,075 A | * | 1/2000 | Parris et al. ................... 521/64 |
| 6,777,377 B2 | * | 8/2004 | Myers et al. ................ 507/120 |
| 6,814,145 B2 | * | 11/2004 | Maberry et al. ............. 166/294 |

OTHER PUBLICATIONS

"Zirconium(IV) Chloride" retrieved Feb. 11, 2008 from http://en.wikipedia.org/wiki/Zirconium%28IV%29_chloride.*

SPE 50752 Controlling in-situ Gelation of Polyacrylamides by Zirconium for Water Shutoff—Chaubeteau G., Tabary R., Renard M. Omari A. Copyright 1999, Feb. 16-19, 1999.

* cited by examiner

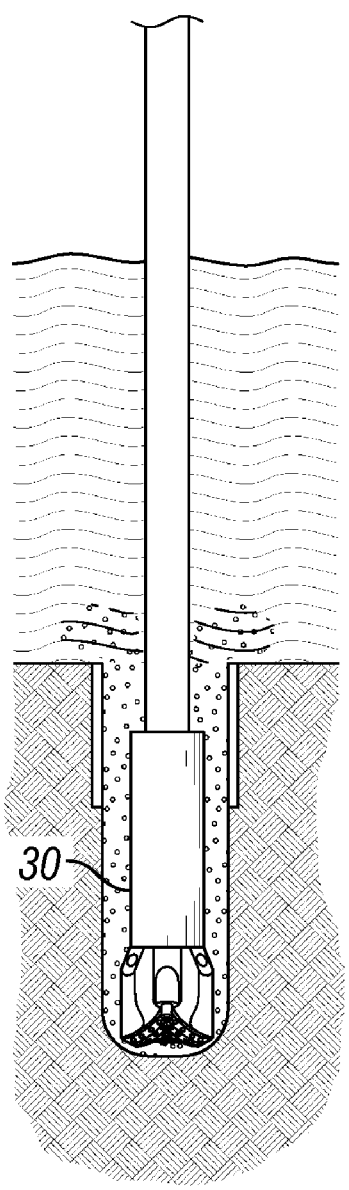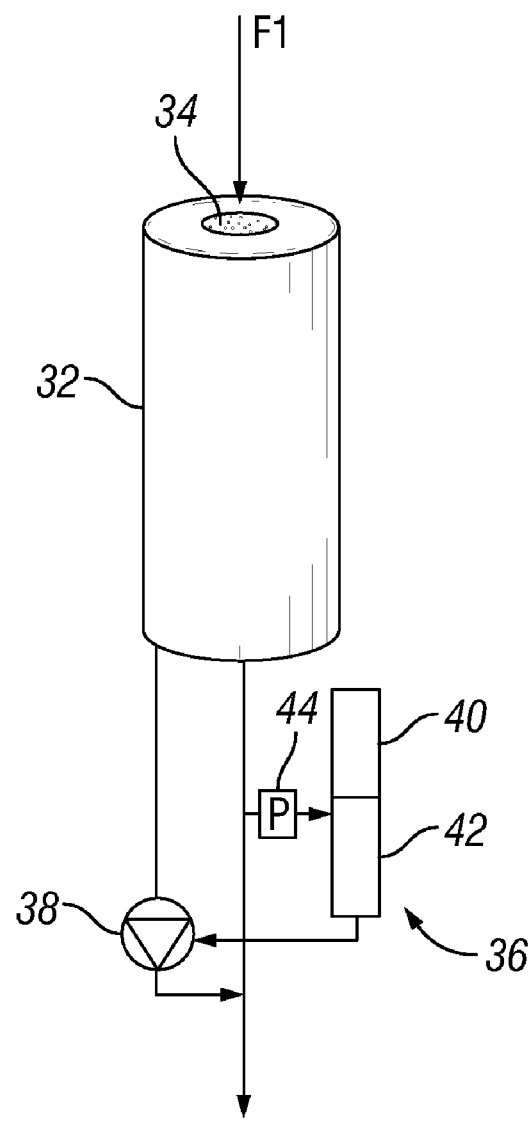
FIG. 4          FIG. 5

METHOD OF CONSOLIDATING AN UNDERGROUND FORMATION

TECHNICAL FIELD OF THE INVENTION

This invention relates to techniques for the consolidation of underground formations, which can be applied during the construction of a well or borehole through such formations.

BACKGROUND OF THE INVENTION

It is often the case that wells or boreholes must be constructed through formations comprising unconsolidated or poorly cemented materials (the term "unconsolidated" will be used throughout this document to refer to both unconsolidated and weakly-consolidated or poorly-cemented formations). Such materials include sand, gravel particles, or other mineral particles commonly found in sandstone formations such as clays, feldspars and micas. The weak physical structure of such formations can lead to a number of problems during the drilling, completion and production life of the well.

Particular difficulties can be encountered when drilling wells in shallow, unconsolidated sand formations in deepwater environments (in this case, "shallow" refers to depths not far below the sea bed). Because these formations are very weak, the density of the drilling fluid used to drill the well must be kept as low as possible in order to avoid fracturing the formation. The consequence of this is a very narrow mud window, i.e. the difference between the minimum pressure the drilling fluid must exert to prevent uncontrolled influx of fluids from the formation and the maximum pressure it can exert before fracturing the formation is small. While casing can be set in the well to isolate such formations, a stable formation is required to anchor the casing. Also, it is generally considered undesirable to set many casings, since each casing leads to a decrease in the diameter of the well and an increase in cost of the well.

One phenomenon which is sometimes found (although not systematically) in association with unconsolidated formations is that of methane hydrates. In the 1970's deepwater drilling projects discovered that methane hydrates occur naturally in deepwater sediments at the outer continental margins often associated with conventional deepwater oil and gas reservoirs, as well as in the known polar continental regions. In open sea, sediment accumulates on the sea bed. As the layer of sediment accumulates, lower sediments solidify and harden (become consolidated). The upper sediments remain soft (unconsolidated) and it is amongst these weak, unstable layers of sediment that methane hydrate-bearing layers are found. The conditions required for stability of methane hydrates are only found at depth of up to 280 m below the sea bed in water depths of 1000 m, or up to 570 m below the sea bed where the water depth in 4000 m.

The chemical and physical processes existing within methane hydrate formations can lead to physical instability of the underground formations (the ocean continental margin slope). This physical instability can lead to problems of hole enlargement or collapse when a well is drilled through unconsolidated sand formations even in cases where methane hydrate is not present in the formation in question (methane hydrate environments are not per se, unconsolidated but can exist below unconsolidated formations and/or can become unstable with methane hydrate recovery). It has been the practice in some locations to abort a drilling operation once a methane hydrate formation is encountered and move drilling to another location. These problems of instability can occur throughout the life of the well even if the well can be drilled successfully.

Unconsolidated formations can lead to other problems during the production life of the well. It is common for particulate material (sand) to be produced into the well together with the formation fluids from unconsolidated formations. Produced sand is undesirable for a number of reasons. It can remain in the well and lead to blockage or restriction in the flow path reducing the ability of the well to produce the fluids of interest. If the sand has small particle size, or flow is high, the sand can be carried up the well and lead to extensive erosion of completion and surface equipment, which can be both dangerous and expensive to replace. Such problems are particularly apparent when a large drawdown exists. Sustained sand production can lead to the formation of a cavity near the well, which can lead to collapse, and loss of the well. The various techniques for addressing this problem are known as "sand control".

One set of techniques for sand control includes chemical treatment of the formation to reduce sand production, often called "formation consolidation". One particular example of this can be found in U.S. Pat. No. 5,082,057 which describes a treatment system in which a partially-hydrolysed polyacrylamide solution in brine is cross-linked using chromium ($Cr^{3+}$) ions. The solution is placed in the formation in an essentially non-cross-linked state and is allowed to remain in place for cross-linking to take place before the well is put into production. The rheology of the treatment fluid is selected to allow placement in the formation up to 10 m radially from the well. The molecular weight of the partially-hydrolysed polyacrylamide is typically less than 500,000 and the polymer is used at concentrations of less than about 7%.

Other chemical techniques for formation consolidation can be found in U.S. Pat. Nos. 3,978,928, 4,427,069, 4,512,407 and U.S. Pat. No. 4,903,770. U.S. Pat. No. 5,849,674 discloses a system for stabilising unconsolidated sediments, comprising a carboxylate-containing polymer (including acrylamide-containing polymers such as partially hydrolysed polyacrylamides (PHPA)) and a cross-linking agent such as a multi-valent metallic compound (including zirconium lactate), and optionally other drilling fluid materials such as clays and weighting agents. The system is mixed before the placement and then, pumped into the zone of interest where it is allowed to gel.

Other techniques for handling particulate materials in the wellbore are found in the field of formation fracturing technology. In fracturing, it is often desirable to inject a particulate material (a proppant) into the fractured formation to keep the fractures open and so leave improved flow paths into the well for the produced fluids. In such techniques, the proppant is suspended in a fluid containing a gelling agent. A variety of gelling agents can be used, including hydratable natural polymers such as polysaccharides, guar gum, etc. or hydratable synthetic polymers such as PVA, polyacrylamides, etc. Cross-linking agents are used to increase the viscosity of the carrier fluids. Alkali metal compounds such as borates, borax, boric acid, etc., which are capable of releasing multi-valent metal ions in aqueous solutions, are used as cross-linking agents. Examples of the multi-valent ions are chromium, zirconium, antimony, titanium, iron, zinc and aluminium. The cross-linking agents are typically added to the gelled fluid at levels in the range 0.01-1% by weight of fluid. Zirconium cross-linked CMHPG polymer solutions are widely used as carrier fluids for high temperature applications. Because zirconium cross-linked fluids are easily degraded by shear, chemicals are added to delay cross-linking until the fluids enter the perforations. Once the proppant is placed in the fractures, gel breakers are used to cause the carrier fluid to revert to a thin, low-viscosity state that can be produced back to the surface leaving the proppant in place.

Application of these techniques to drilling in shallow unconsolidated formations in a deepwater environment encounters various problems. The temperature is often relatively low, the dynamic physical processes encountered during drilling make placement difficult, and the presence of methane hydrates mean that any exothermic reactions can lead to significant stability problems.

SUMMARY OF THE INVENTION

It is an object of this invention to provide a formation consolidation technique that attempts to address some or all of these problems.

The invention provides a method of stabilising an underground formation surrounding a borehole comprising first placing a gel forming solution in the formation, said gel forming solution including a cross-linkable polymer and a crosslinker and then, pumping an activator to accelerate the crosslinking of the polymer and the development of the gel strength.

The cross-linkable polymer can be a polymer containing acrylamide functional groups ("an acrylamide polymer"). Suitable acrylamide polymers include polyacrylamide (PA), partially hydrolysed polyacrylamide (PHPA) and copolymers of acrylamides and acrylates. Low molecular weight polymers are preferred, having a molecular weight of around 500,000. These polymers can be partially hydrolysed, for example having a 5% degree hydrolysis. The molecular weight and degree of hydrolysis can be selected according to requirements. A suitable polymer solution might contain 7% active weight of polymer at pH 7 and a specific gravity of 1.03 g/cm$^3$.

The cross-linking agent can be a molecule or complex containing a reactive transition metal cation. Zirconium cations are preferred, typically complexed or bonded to anions, oxygen atoms or water. Zirconium lactate can be used effectively as a cross-linking agent of this type. Examples of a suitable zirconium lactate solutions include a sodium-zirconium lactate solutions of 6.0-6.5% zirconium at a pH of 10.5 and a specific gravity of 1.19 g/cm$^3$, or 7.0-7.4% zirconium at a pH of 6.2 and a specific gravity of 1.19 g/cm$^3$.

The treatment solution can have a viscosity of up to 300 cp, such fluids being able to penetrate formations even at relatively low initial permeabilities. Solution having a viscosity around 100 cp can easily penetrate the formation.

The activator can be an acid solution containing ions or compounds that cause cross-linking to take place in the treatment fluid leading to in-situ gelling of the fluid. One such fluid comprises an acidic solution of zirconium chloride, for example a solution of 5% active material at a pH of 0.5 and a specific gravity of 1.01 g/cm$^3$. Alternatively, the fluid can comprise zirconium acetate with, for example, a zirconium content of 15-16%, a pH of 3.5 and a specific gravity of 1.28 g/cm$^3$. The treatment solution or the activator may optionally include colloidal silica, for example at levels of about 1%. The activator reacts relatively quickly at low temperatures (4-15° C.), and the cross-linking is not exothermic.

The method of the invention can be applied during drilling. In such a case, the treatment fluid and activator can be placed in the zone of interest by sequentially pumping first the treatment fluid, then the activator, into the well though a drill string or the like. This sequence of treatment fluid and activator can be repeated a number of times according to requirements. In this way, a "train" of fluid slugs can be delivered to the zone of interest, the slugs of treatment fluid and activator being separated from each other by spacer fluids (for example, sea water). In this manner, the fluids can be pumped from the surface.

The fluids can be applied to the formation by means of a placement tool placed in the drill string, which injects the fluids into the formation via ports, while mechanically compressing the borehole wall by means of structures formed on the outside of the placement tool which act on the borehole wall as the drill string rotates.

In another placement technique, the activator can be stored in a downhole reservoir near the bottom of the drill string and injects a slug of activator into the drilling fluid in response to a signal from the surface.

In order to avoid physical damage to the formation, the fluids can be placed in the formation at a relatively low pressure, for example around 3 bars.

BRIEF DESCRIPTION OF THE DRAWINGS

A more detailed description of illustrative examples of the invention follow, with reference to the accompanying drawings, in which:

FIG. 4 shows another tool for delivering fluid in the borehole; and

FIG. 5 shows schematic detail of the tool shown in FIG. 4.

DETAILED DESCRIPTION AND PREFERRED EMBODIMENTS

Figures 1, 2:
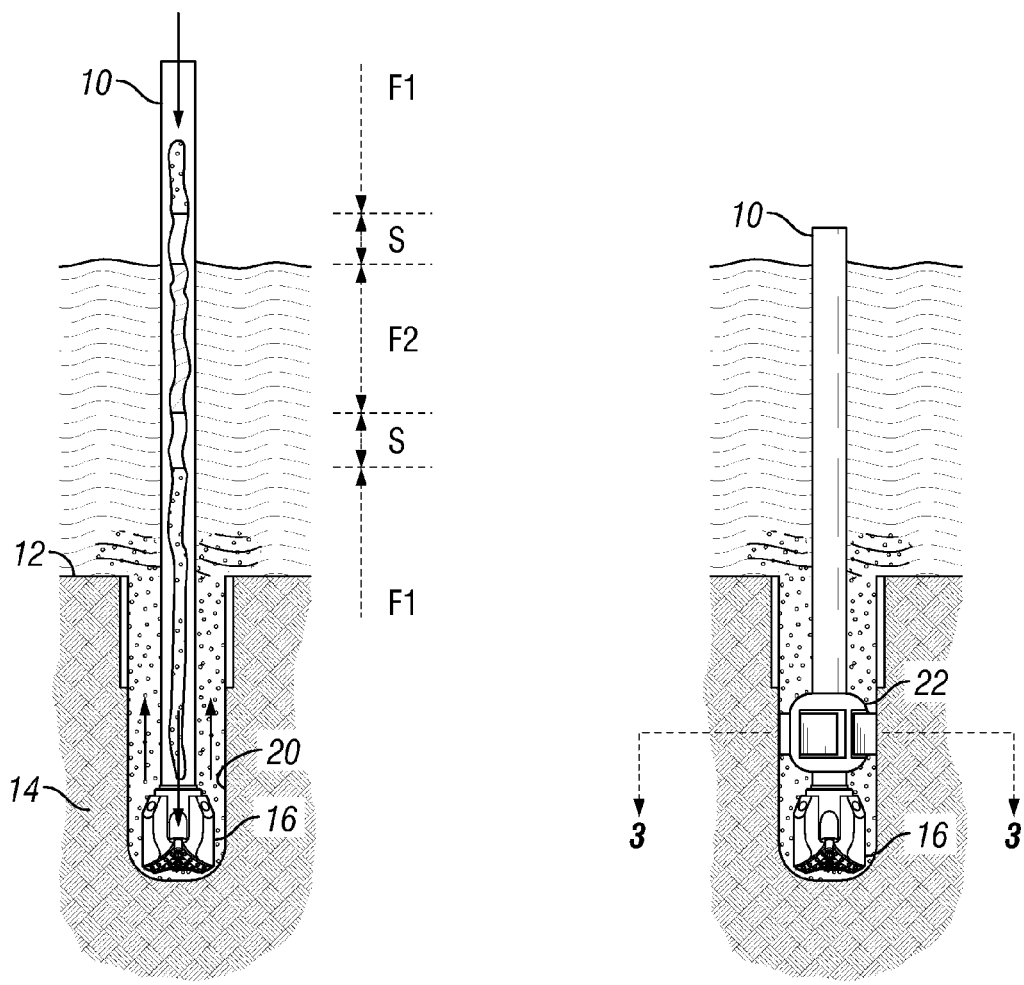
FIG. 1 shows a schematic diagram of a shallow drilling operation in a deep-sea environment.
FIG. 2 shows a schematic diagram of a placement tool for use in the invention.

The method of the invention is particularly applicable to shallow drilling (typically up to 700 m depth) of unconsolidated formations in deepwater environments. In FIG. 1, a drilling rig (not shown) is located at the sea surface and a drill string 10 extends down to the sea bed 12 where it is drilling into the shallow formations 14. In such drilling, a drilling fluid passes down the inside of the drill string 10, exiting though the drill bit 16 at the bottom and returning to the sea bed 12 via the borehole 20, carrying drilled materials with it. The shallow formations 14 are often unconsolidated and may also comprise a methane hydrate environment. Until a consolidated formation is encountered, it is effectively impossible to drill deeper and so the distance that can be drilled before the open borehole requires a casing is not optimal in term of cost and time. In order to stabilise the formation 14, a train of fluids is pumped through the drill string 10. The fluids comprise a treatment fluid F1 followed by a spacer S and an activator F2.

The treatment fluid F1 comprises a solution of PHPA and for example, a sodium-zirconium lactate in seawater. The activator F2 comprises for example a solution of zirconium chloride and colloidal silica in seawater. The spacer is seawater.

As the treatment fluid enters the well, the pressure of the fluid is sufficient for some to penetrate the formations 14, for example up to depths of 10 cm although the actual depth of penetration will vary and may be greater (see the experimental setup described below). The remainder of the fluid F1 returns to the seabed. Because the temperature in the well is relatively low the cross-linking reaction takes place only very slowly and does not provide sufficient increase in gelling to support the formation. Once the slug of treatment fluid F1 has passed, and the spacer S has passed out of the drill string 10, the activator fluid F2 enters the well and contacts the treatment fluid F1 that has penetrated the formation 14. This causes cross-linking to begin and for the treatment fluid F1 to gel and consolidate the formation 14. As the cross-linking reaction is not exothermic, methane hydrates that may possibly be present in the formation 14 will not be affected and so further physical instability is avoided.

As drilling progresses, further slugs of treatment fluid F1 and activator fluid F2 are pumped through the drill string 10 to consolidate the newly drilled formations.

Figure 3:
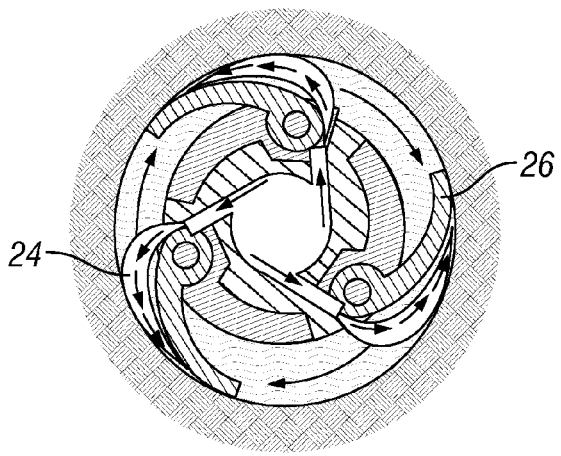
FIG. 3 show a cross-section on line AA of FIG. 2.

The method described in relation to FIG. 1 relies on the pressure of the drilling fluid to force the treatment fluid into the formation and the cross-linking of the fluid to provide the strength. FIGS. 2 and 3 show a placement tool 22 that can be located in the drill string 10 just above the drill bit 16. This tool 22 has calibrated injection ports 24 which allow the treatment fluid F1 or activator fluid F2 to be directed at the wall of the borehole 20. At the same time, mechanical flaps or vanes 26 are urged against the wall of the borehole so as to gently compress or compact the wall material in a "plastering" effect as the drill string 10 rotates to further improve the mechanical properties.

FIGS. 4 and 5 show another tool for putting the invention into effect. In this case, a reservoir 30 is located in the drill string 10 near the drill bit 16. The reservoir comprises an annular tank 32 having a flow passage 34 extending through the middle, which allows to flow through the drill string 10 and bit 16 in the normal way. A valve pump 36 supplies fluid from the tank 32 to the flow passage 34 through a valve 38. A battery 40 and timer 42 are provided to control operation of the pump 36 and valve 38. Control signals can be provided to the system by means of pressure pulses in the fluid flowing from the surface, which are detected by a pressure sensor 44 connected to the system.

In use, the treatment fluid F1 is pumped through the drill string 10 in the normal way. At the appropriate time, a pressure pulse is created in the fluid to activate the downhole system to inject a slug, or series of slugs of the activator fluid F2 into the flow. This approach avoids he need to provide slugs of fluid F1 and F2 separated by spacers S as described above. This system can be used with the placement tool of FIGS. 2 and 3.

The treatment fluid F1 comprises mixtures of polymer and cross-linking agent in appropriate ratios to obtain the desired degree of cross-linking and viscosity. One such composition comprises a solution of 6-7% by weight of low molecular weight PHPA with approximately 5% degree of hydrolysis in seawater. The PHPA is typically a granular solid and is dissolved in the seawater with mixing. Cross-linking agent, such as sodium-zirconium lactate solution of 6.0-6.5% zirconium at a pH of 10.5 and a specific gravity of 1.19 g/cm$^3$, or 7.0-7.4% zirconium at a pH of 6.2 and a specific gravity of 1.19 g/cm$^3$, is mixed with the PHPA solution in an amount of up to 40% by weight of PHPA.

The activator fluid F2 can be a solution of zirconium chloride with 5% active material at a pH of 0.5 and a specific gravity of 1.01 g/cm$^3$. Alternatively, the fluid can comprise zirconium acetate with a zirconium content of 15-16%, a pH of 3.5 and a specific gravity of 1.28 g/cm$^3$. The treatment solution and the activator may optionally include colloidal silica for example, at levels of about 1%.

Mixing of the various components in the fluids F1 and F2 is performed in the usual manner. Attention is required to ensure good mixing and adequate hydration of the polymer to allow good cross-linking. The exact measures taken will depend on the mixing system used to mix the fluids at the surface.

It will be appreciated that the examples given above are illustrative only and that the exact form and concentrations of the different constituents can be selected according to operational requirements, in particular the viscosity and temperature of use.

The performance of the treatment fluids of the invention is demonstrated experimentally by testing the fluids in columns of saturated, unconsolidated sand having predetermined permeability and porosity. In these tests, synthetic unconsolidated sands are prepared by mixing inert particulate materials of different particle sizes. The sands are loaded into PVC tubes (42.6 mm diameter, 300 mm length) having a fine mesh at either end. The permeability of the sand cores thus formed is measured by filling the packed tube with sea water, applying pressure and measuring flow from the tube as a function of time. Permeability is calculated from Darcy's law. Porosity is obtained by weighing the packed tubes in a dry state and after being filled with seawater. The porosity is calculated from $$\text{Porosity } (\%) = [(W_{wet} - W_{dry}/d_{seawater} \cdot V_{dead}]/V_{core}$$

where $W_{wet}$=weight of packed tube after filling with sea water
$W_{dry}$=dry weight of packed tube
$d_{seawater}$=density of sea water
$V_{dead}$=volume of water trapped at the top of the core assembly
$V_{core}$=volume of the core.

For the test, tubes are packed and held at the test temperature (25° C., 8° C., 4° C.) overnight, before saturation with seawater. During the injection test, the initial fluid (seawater) is displaced by a number of pore volumes of the treatment solution, which is then itself displaced by the activator fluid. The ability of the treatment solution to penetrate the formation depends on the permeability of the formation. The effective viscosity of the fluid in the cores is affected by the pore size, shape and distribution. Following the injection test, the cell is subjected to the desired temperature during a given shut-in-time i.e. the Consolidated cores were kept at test temperature to set the fluid.

It is easy to distinguish consolidated and unconsolidated parts. The consolidation treatment results in cores, parts of which can be handled (the unconfined compressive strength measurements of these consolidated parts of the cores can be made using mechanical press), and parts in which the wetted sand is completely unconsolidated and has no inherent strength (when extruded from the tube the sand liquefies and flows). Consolidated zones are obtained at the top of the sand column, mainly due to the injection time used by the experimental procedure. The treatment fluid penetration should be sufficient in order to obtain a measurable consolidated zone i.e. between 3 and 5 cm. The sand core can be divided in three separated zones whatever the test conditions as follows:

Top: a Consolidated zone more or less strongly is obtained after the treatment solution reacts with the activator.
Middle: the treatment solution alone with particles sand.
Bottom: wetted particles sand.

Figure 6:
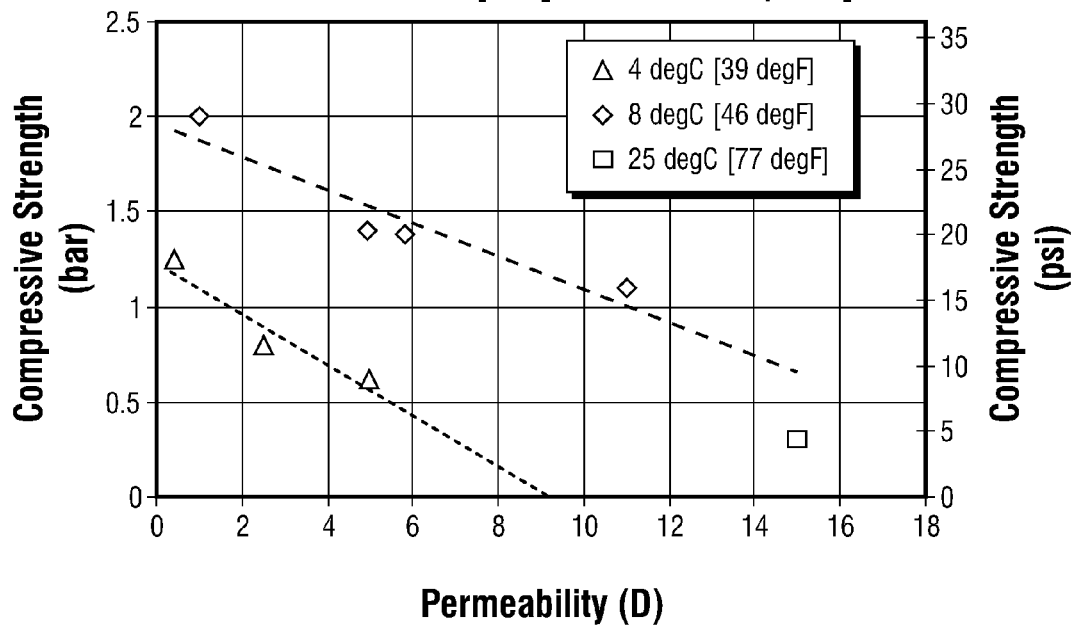
FIG. 6 shows compressive strength vs. permeability for a treatment at different temperatures.

The Consolidated samples are removed from the cell. Cores samples were 42 mm in diameter and 25 to 60 mm long. Unconfined compressive strength measurements are made on these pieces using standard procedures. Samples for unconfined compressive strength measurements are prepared by placing Consolidated core samples inside the ram of a mechanical press. The compressive strength measurements made on this press are gathered in FIG. 6 which shows compressive strength vs permeability figures for 7% PHPA+10% sodium-zirconium lactate, then 5% ZrCI4 in seawater at 4° C. (▲), 8° C. (♦) and 25° C. (■).

The gel strength is first estimated by crush test with mechanical press. Then in order to perform easier, simpler and shorter tests in the time available, the gel strength is measured in test tubes. The purpose of these tests is to estimate the final gel strength with time. The treatment solution is poured into the tubes and shaken or sheared with the activator, for example, ZrCI4. It is then held at temperature over a period of time. Periodically (10', 1 h, 3 h, 24 h in this case), tubes are removed from oven or fridge and the mechanical strength of the gel is determined.

As crosslinking is developing a very slight gel is forming by small microgels. The development of stronger gels becomes measurable by tongue lengths. These tongue lengths are measured by placing each tube horizontally allowing the gelling composition to flow to its equilibrium position and then measuring then length of the tongue formed. As gelation progresses with time, stronger gels and shorter tongue lengths are developed. The gel strength is expressed mathematically as:

% Gel Strength=$(TL-tL\times 100/TL)$

Where TL equals tube test length (200 mm), and tL equals the tongue length of the gel measured in millimetres from the point at which the gel contacts the entire circumference of the tube to the farthest point to which the gel has spread. Thus, the strongest gels would have gel strength of 100% and the weakest gels would have gel strength of 0%.

Figure 8:
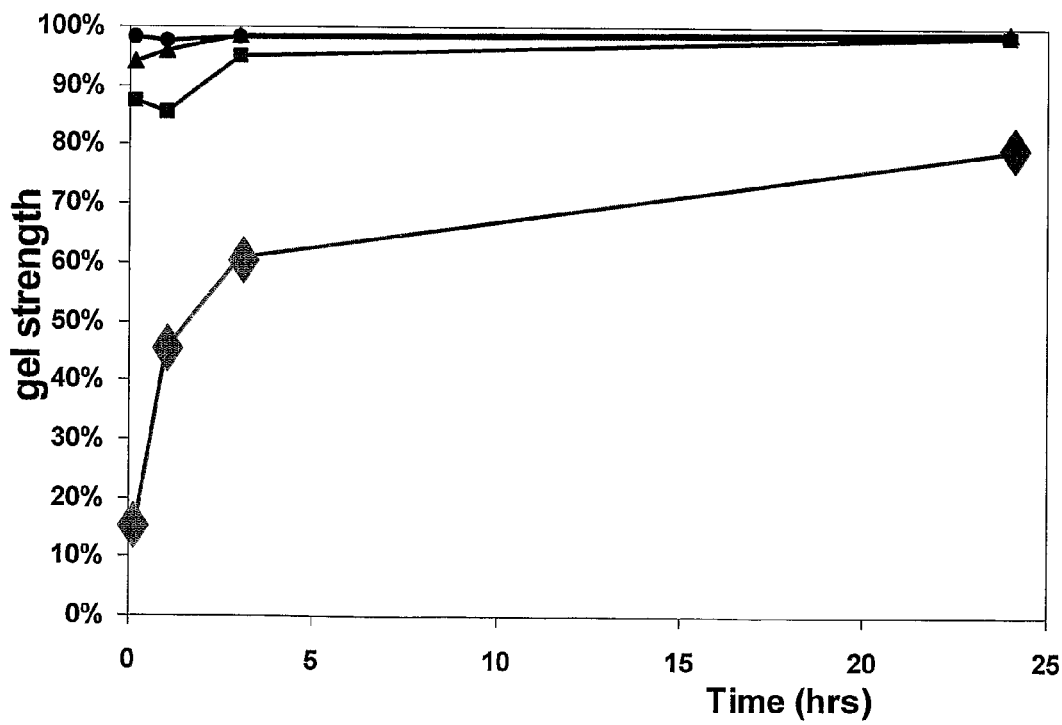

FIG. 8 plots gel strength vs. time for the following mixtures:
- ♦=7% PHPA+10% sodium-zirconium lactate, then 5% ZrCI4 I seawater;
- ■=7% PHPA+10% sodium-zirconium lactate, then 10% ZrCI4 in seawater;
- ▲=7% PHPA+10% sodium-zirconium lactate, then 15% ZrCI4 in seawater; and
- *=7% PHPA+10% sodium-zirconium lactate, then 20% ZrCI4 in seawater.

Figure 7:
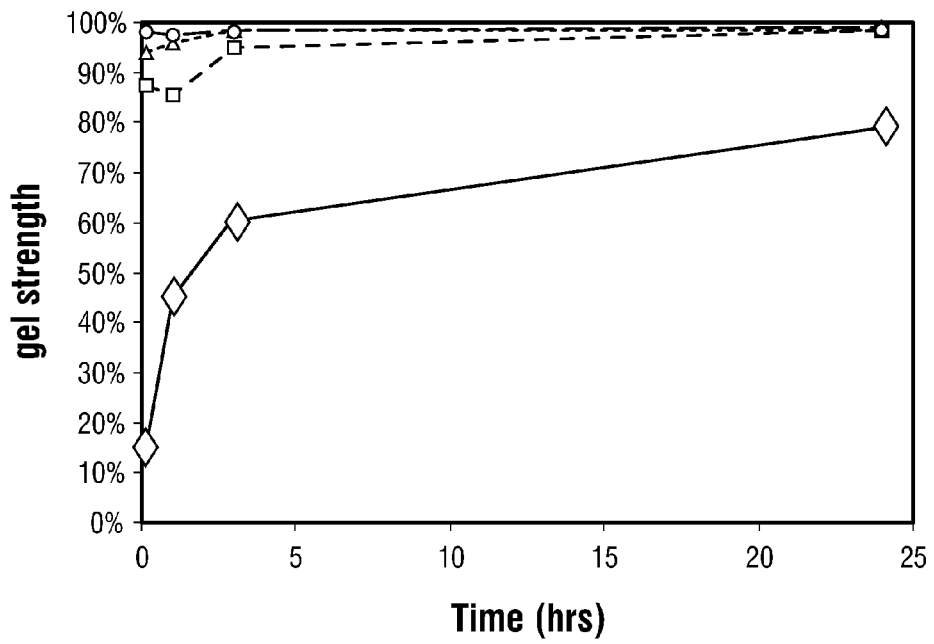
FIG. 7 shows gel strength development over time for treatment fluids at different activator concentrations.
Figure 7:
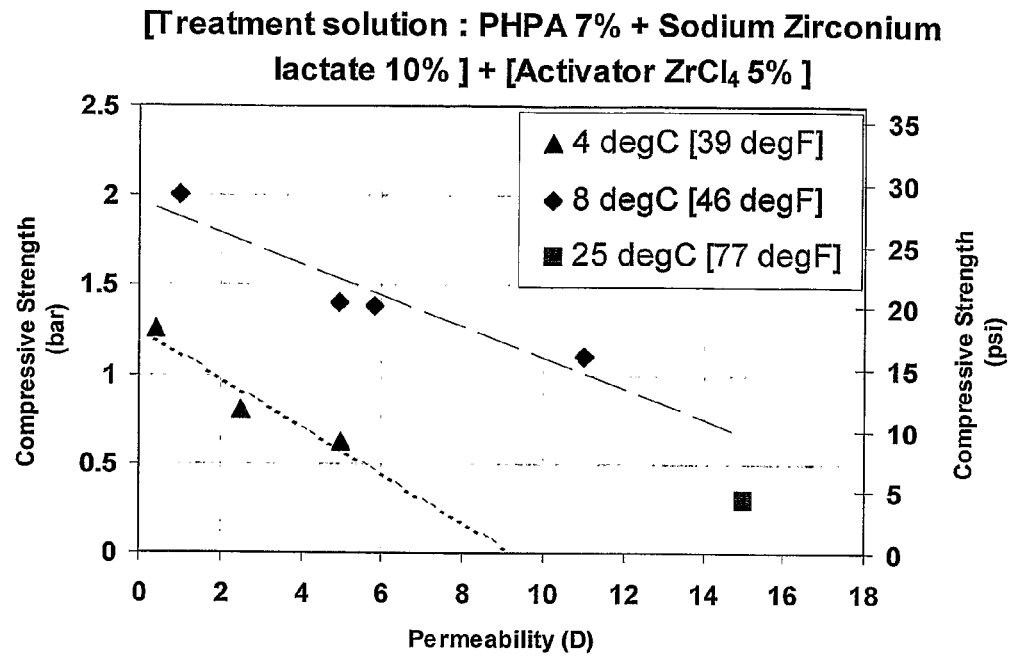

As can be seen in FIG. 7, above 10% of ZrCI4 in seawater, the gel appears almost immediately, after which it is almost impossible to determine any difference between the curves. With 5%, the gel does not reach 100% strength even after 24 hours.

The invention claimed is:

1. A method of drilling a well comprising during said drilling of the well a stabilization treatment of an underground formation surrounding a borehole, wherein said stabilization treatment comprises placing a treatment fluid in the formation, wherein the treatment fluid comprises a cross-linkable polymer and a cross-linking agent, allowing the treatment fluid to gel in-situ, and pumping, after placement of the treatment fluid in the formation, an activator fluid into the well to accelerate the crosslinking of the polymer and the development of the gel strength.

2. The method of claim 1, wherein the reaction between the activator and the treatment fluid is not exothermic.

3. The method of claim 1, wherein the cross-linkable polymer is a polymer containing acrylamide functional groups.

4. The method of claim 3, wherein the polymer comprises polyacrylamide, partially hydrolysed polyacrylamide or copolymers of acrylamides and acrylates.

5. The method of claim 3, wherein the polymer is a partially hydrolysed polymer with a molecular weight of around 500,000.

6. The method of claim 1, wherein the cross-linking agent is a molecule or complex containing a reactive transition metal cation.

7. The method of claim 6, wherein the cross-linking agent is a zirconium lactate solution.

8. The method of claim 1, wherein the activator comprises a solution of zirconium chloride or zirconium acetate.

9. The method of claim 7, wherein the activator comprises a 5-20% solution of zirconium chloride in seawater.

10. The method of claim 1, wherein the activator and/or treatment fluid includes colloidal silica.

11. The method of claim 1, wherein the treatment fluid has a viscosity of up to 300 cp.

12. The method of claim 1, whereby the treatment fluid and the activator are sequentially placed into the well through a drill string.

13. The method of claim 12, wherein the sequence is repeated.

14. The method of claim 12, wherein the treatment fluid and the activator are separated from each other by spacer fluids.

15. The method of claim 1, wherein the fluids are applied to a zone of interest by means of a placement tool placed in the drill string which injects the fluids into the zone of interest via ports, while mechanically compressing the wall of the well by means of structures formed on the outside of the placement tool which act on the borehole wall as the drill string rotates.

16. The method of claim 1, wherein the activator is stored in a downhole reservoir located near the bottom of the drill string and arranged to inject slugs of activator into a drilling fluid.

17. The method of claim 1, wherein the bottomhole well temperature ranges from about 4° C. to about 25° C.

* * * * *